United States Patent [19]

Minoru

[11] Patent Number: 4,469,197
[45] Date of Patent: Sep. 4, 1984

[54] DRIVE MECHANISM FOR TOY RUNNING VEHICLES

[76] Inventor: Ishida Minoru, 8-302, No. 8, Ikenohata 4-Chome, Taito-ku, Tokyo, Japan

[21] Appl. No.: 347,782

[22] Filed: Feb. 11, 1982

[30] Foreign Application Priority Data

Sep. 30, 1981 [JP] Japan .......................... 56-145497[U]

[51] Int. Cl.³ .............................................. F03G 1/00
[52] U.S. Cl. ..................................... 185/45; 446/464; 185/37; 185/DIG. 1
[58] Field of Search ............... 185/37, 39, 45, DIG. 1; 46/206

[56] References Cited

U.S. PATENT DOCUMENTS

| | | | |
|---|---|---|---|
| 729,765 | 6/1903 | Ives | 185/DIG. 1 |
| 1,952,713 | 3/1934 | Kelch | 185/45 |
| 3,018,097 | 1/1962 | Johansson | 185/45 X |
| 4,135,329 | 1/1979 | Kennedy | 46/206 |

Primary Examiner—Allan D. Herrmann
Attorney, Agent, or Firm—Holman & Stern

[57] ABSTRACT

A drive mechanism for toy running vehicles comprises a frame member having a circular recess for receiving a coil spring therein, a gear, a pinion, and a gear mechanism for connecting the gear and the pinion within the recess with a drive shaft having wheels mounted thereon, a cover for the frame, another frame snap-engaged with the first mentioned frame and a spring in the recess. The inner end of the spring is inserted through a guide slot formed in the first frame and wound within the recess, the inner peripheral wall face of which has a plurality of small recesses for receiving the outer end of the wound spring.

3 Claims, 6 Drawing Figures

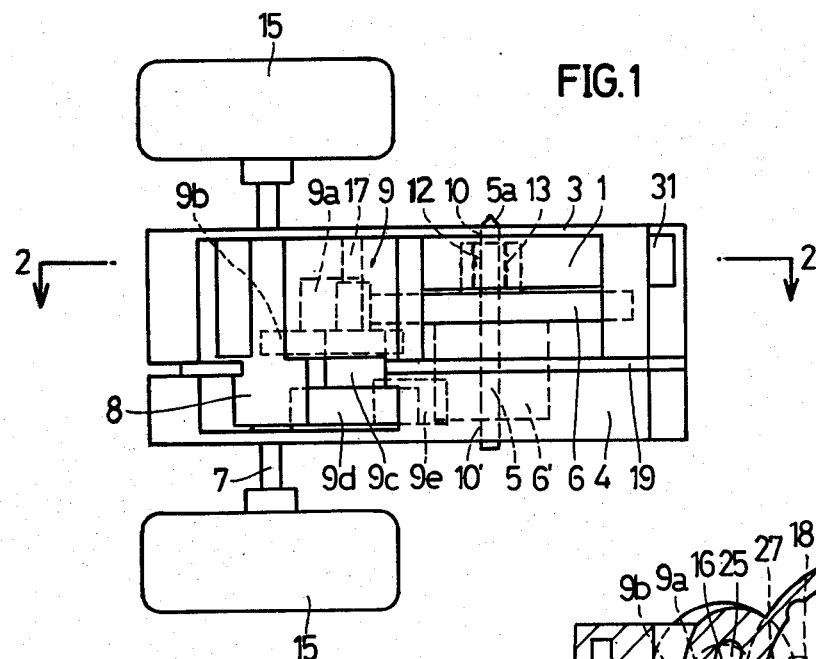
FIG.1
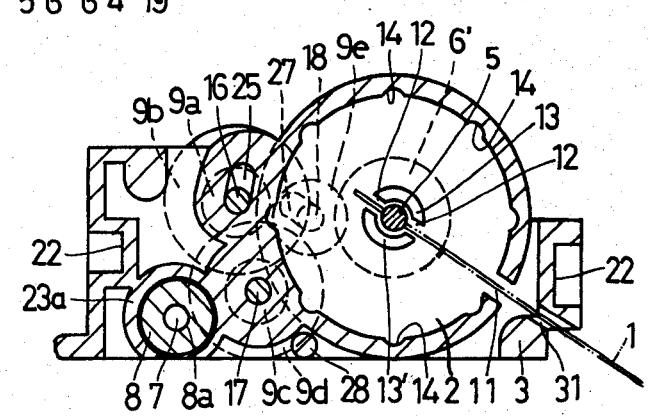
FIG.2
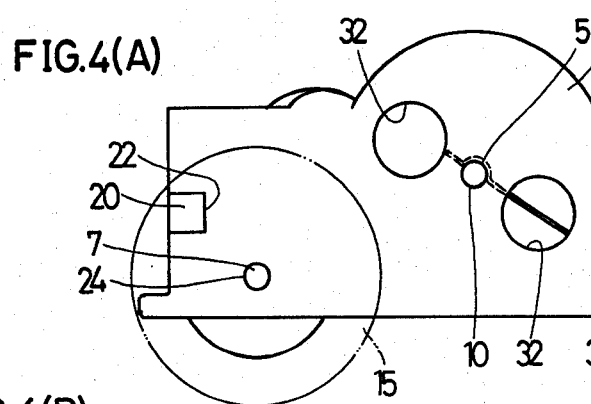
FIG.4(A)
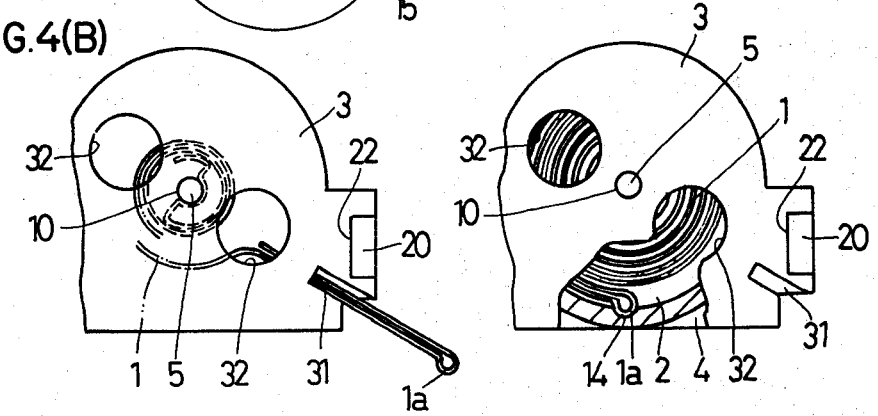
FIG.4(B)
FIG.4(C)

DRIVE MECHANISM FOR TOY RUNNING VEHICLES

BACKGROUND OF THE INVENTION

1. Field Of The Invention

This invention relates to a drive mechanism to be installed in relatively small toy running vehicles.

2. Description Of The Prior Art

Conventional toy drive mechanisms have required a number of steps for assembly thereof and the manufacturing process has been troublesome.

SUMMARY OF THE INVENTION

The object of the present invention is therefore to provide a drive mechanism for toy running vehicles wherein a drive spring can easily be wound in a very simple operation.

This object is achieved in the invention by providing a drive mechanism for toy running vehicles comprising a frame having a circular recess for receiving a spring and another frame to be assembled with the afore-mentioned frame by snap engagement, a gear to be mounted on the shaft inserted through both frames for the spring, a gear mechanism for connecting the gear with a pinion mounted on the shaft inserted through both frames, the circular recess being formed with a guide slit for winding the spring, the shaft for the spring to be inserted into the holes of the frames for holding the spring having its head pointed or rounded, the gear having on its rear side a slit for engaging the spring, the slit being made by the opposing projections formed on the rear side of the gear, and a plurality of small recesses for receiving the rear end of the wound spring being formed on the inner peripheral face of the circular recess.

BRIEF DESCRIPTION OF THE DRAWINGS

The invention will now be described in more detail with reference to the accompanying drawing showing one preferred embodiment of the mechanism for toy running vehicles according to this invention, wherein:

FIG. 1 is a bottom diagrammatic plan view of the mechanism of the present invention;

FIG. 2 is a cross-sectional view taken along the line 2—2 in FIG. 1;

FIG. 4(A) is a front elevational view showing an initial stage of installing a spring into the mechanism of the invention;

FIG. 4(B) is a partial view similar to FIG. 4(A) showing a later stage of installing a spring; and FIG. 4(C) is a view similar to FIG. 4(B) with part broken away, showing the spring installed.

DETAILED DESCRIPTION

Figure 3:
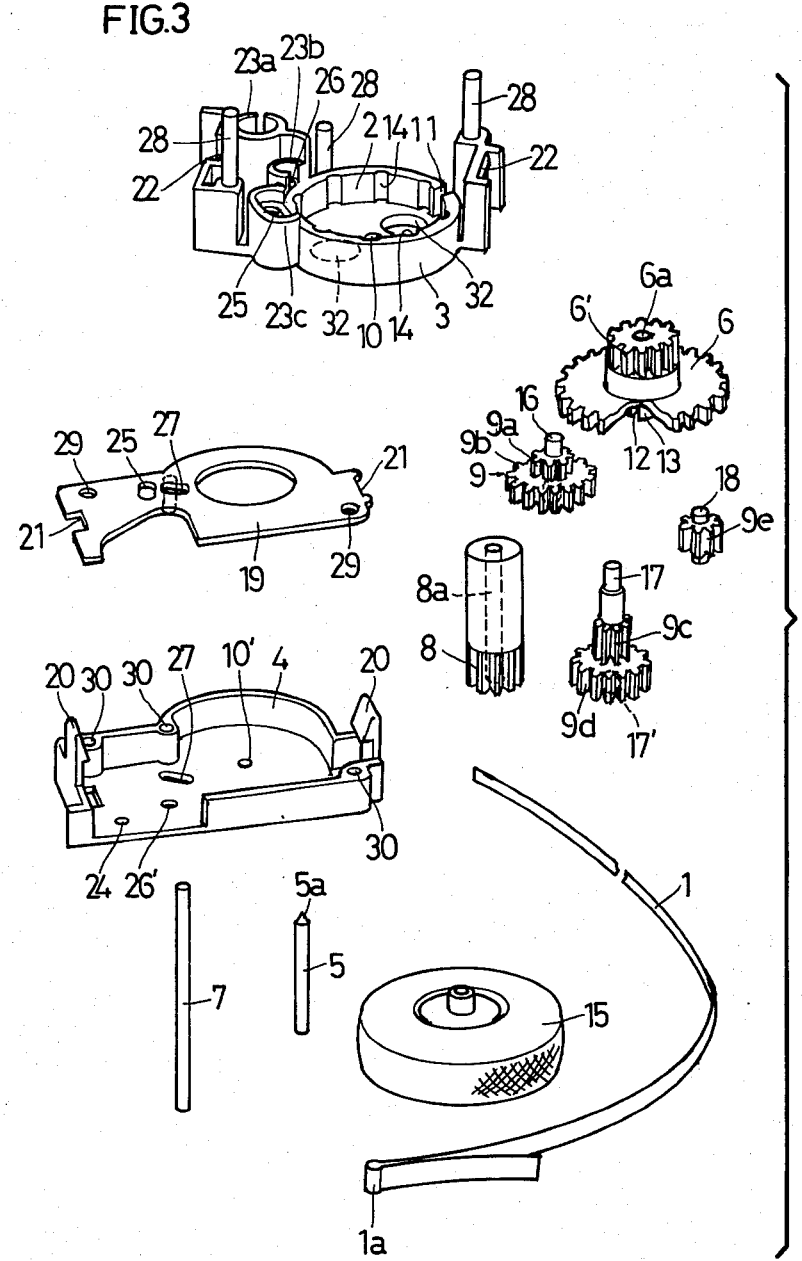
FIG. 3 is an exploded perspective view of the components of the invention.

Referring now to the figures of the drawing, 1 is a spring which is to be installed by winding within a circular recess 2 formed in a frame 3 which is to be assembled with another frame 4 by snap engagement with each other.

Reference numeral 5 indicates a shaft on which is to be mounted a gear 6, and between the gear 6 and a pinion 8 mounted on a shaft 7 inserted through the frames 3 and 4 there is disposed a gear mechanism 9 for connecting the gear 6 with the pinion 8.

The circular recess 2 is provided with a guide slit 11 through which can be wound the spring, and the shaft 5 with its head 5a pointed or rounded is inserted through holes 10, 10' of the frames 3, 4 to hold the spring 1.

Gear 6 is provided on its rear side with a spring engaging slit 12 formed by a pair of opposing projections 13, 13'.

On the inner peripheral surface of the circular recess 2 there is formed a plurality of small recesses 14 spaced from each other for receiving the curved rear portion 1a of the spring 1.

Furthermore, in the drawing 15 indicates a wheel; 9a through 9e show each of the gears of the gear mechanism 9; 16, 17 and 18 are their support shafts, respectively; 6' is a gear formed integrally with the gear 6 which is to be engaged with the gear 9e.

19 is a cover applied to the frame 3; 20 are snaps provided on the frame 4 and to be inserted into the recesses 21 of the cover 19 and engaged with respective engaging portions 22.

The frame 3 is formed with wall faces 23a, 23b, and 23c of split circular shape for receiving the gears 9a, 9b, 9c, 9d and 9e, so that at the time of assembly the gears 6, 8 and gear mechanism 9 can be held without the shafts 5 and 7.

Numeral 24 denotes an insertion hole for the shaft 7; 25 an insertion slot for the support shaft 16; 26 an insertion hole for the support shaft 17'; 27 is an insertion slot for the support shaft 18; 28 are pins which project from the frame 3 and which are to be inserted into the holes 29 of the cover 19 as well as the holes 30 of the frame 4.

Numeral 31 is a guide slit for the spring 1 formed in the frame 3.

In the present invention, the gear 6, pinion 8 and the gear mechanism 9 are assembled together in the frame 3 and, after the cover 19 has been applied thereto, the frame 4 is assembled to the frame 3 by snap engagement; and after the shaft 7 has been inserted through the hole 24 into the hole 8a of the pinion 8 the pointed head of the spring 1 is inserted through the guide slit 31 formed in the frame 3 and further through the guide slit 11 formed in the circular recess 2, into the slit 12 between the projections 13 and 13' provided in the gear 6 (FIG. 2), and thereafter, the shaft 5 for fastening the spring is inserted through the hole 10' of the frame 4 into the hole 6a of the gear 6 whereby the shaft 5 with its pointed head 5a will proceed pushing its way through the layers of the leaf spring 1 and, as shown in FIG. 4(A), a portion of the spring 1 will press itself against the shaft 5 and when inserted furthermore the shaft 5 will reach the hole 10 of the frame 3.

In this state described above, by rotating the shaft 5 reversely or by rotating the shaft 7 or wheel 15 in a reverse direction the spring 1 will be wound smoothly (Refer to FIG. 4(B)) and the curved portion 1a at the end of the spring will fit into one of the recesses 14 so as to complete the installation of the spring. The state of winding of the spring can be confirmed through the window 32 provided in the frame 3 (Refer to FIG. 4).

Small recesses 14 are provided in several locations so that the end of the spring 1 may be received into any of the subsequent recesses when it is strongly wound. Thus the installation operation of the spring 1 will be effected smoothly.

According to the present invention, it is not necessary to install the spring by previously winding up the spring as has been done customarily in conventional methods, but it will be sufficient to merely rotate the shaft 5, 7 or the wheel 15 in a reverse direction in order to wind the spring smoothly into the recess portion of the frame.

In addition, when assembled with the wall faces of split circular shape 23a, 23b, and 23c the gear mechanism 9 can be installed in the frames 3, 4 and thereafter the spring 1 may be inserted into the recess and then the shafts 5, 7 are inserted through the frames 3, 4, and by rotating one of the shafts or the wheel 15 in a reverse direction the assembly will be completed.

As described above, the present invention does not require any skillfulness in the operation and the product is suitable for mass production.

What I claim is:

1. A drive mechanism for toy running vehicles comprising, a first frame member, a circular spring receiving recess in said first frame member, a plurality of circumferentially spaced small indented recesses on the inner peripheral wall of said recess, a coil spring in said recess having a curved portion on its outer end releasably and resiliently engaged in one of said small recesses, a guide slot in said first frame communicating with said recess for inserting said spring therethrough into said recess, a second frame member, snap elements on said second frame and cooperating snap engaging means on said first frame for retaining said frame members together, a driven shaft rotatably mounted at its ends in said frame members, a driven gear fixedly mounted on said driven shaft within said frame members, drive shaft holes in said frame members substantially coaxially aligned with said coil spring, a drive shaft rotatably mounted at its ends in said drive shaft holes, one of said ends being pointed, a drive gear member fixedly mounted on said drive shaft, a pair of opposing projections extending from said drive gear member into said recess on opposite sides of said drive shaft to form a slot therebetween, the inner end of said coil spring being inserted through said slot, and a gear mechanism operatively mounted within said frame members in engagement with said drive shaft and driven shaft so that said driven shaft may be driven by said coil spring when said spring has been wound into its driving condition.

2. The drive mechanism as claimed in claim 1 and further comprising a cover plate disposed between said frame members and having notches in the edges thereof engaging with said snap elements.

3. The drive mechanism as claimed in claim 2 and further comprising aligning pins extending from said first frame member, and aligning holes in said cover plate and aligning holes in said second frame member adapted to receive said aligning pins.

* * * * *